J. T. JOHNSON & F. G. MASON.
PNEUMATIC TIRE COVER.
APPLICATION FILED JULY 5, 1912.

1,062,401.

Patented May 20 1913.

UNITED STATES PATENT OFFICE.

JOHN THOMAS JOHNSON AND FREDERICK GEORGE MASON, OF CAULFIELD, VICTORIA, AUSTRALIA.

PNEUMATIC-TIRE COVER.

1,062,401.  Specification of Letters Patent.  Patented May 20, 1913.

Application filed July 5, 1912. Serial No. 707,729.

*To all whom it may concern:*

Be it known that we, JOHN THOMAS JOHNSON and FREDERICK GEORGE MASON, both subjects of the King of Great Britain, residing at "Lindamere," Wanda Road, Caulfield, in the State of Victoria and Commonwealth of Australia, have invented certain new and useful Improvements in Pneumatic-Tire Covers, of which the following is a specification.

This invention relates to pneumatic tire covers and to an improved method of manufacturing the same described in our co-pending application Serial No. 752,557, filed Mar. 7, 1913.

Pneumatic tire covers are now built up of a series of strips of canvas with or without interlying rubber sheets arranged longitudinally about the tire, but it has been found very difficult to cause the superposed sheets of canvas to perfectly adhere in the curved and annular form. It has been further suggested that a tire cover be made with a strip or strips of canvas coated with a semi-elastic composition which while in a tacky condition is wound under tension in successive convolutions upon a rim or form and subsequently vulcanized to cause the convolutions to combine together in a solid mass. In practice, however, this method has been found to be defective owing to the unequal adhesion at the edges or sides of the spirally wound strip or strips.

In a pneumatic tire cover it is of prime importance that the adhesion of the materials composing it shall be as nearly perfect as possible for the purpose of withstanding as one homogeneous whole, the excessive strains to which a tire is subjected when in use.

In devising our invention we have paid special attention to obtaining the best adhesion possible of the parts forming a tire cover, and have illustrated the invention in the accompanying drawings, in which—

Figure 1:
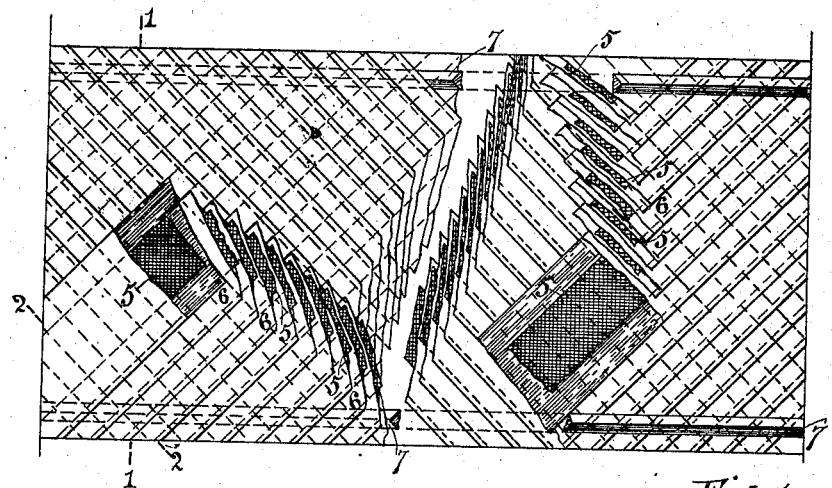
Figure 2:
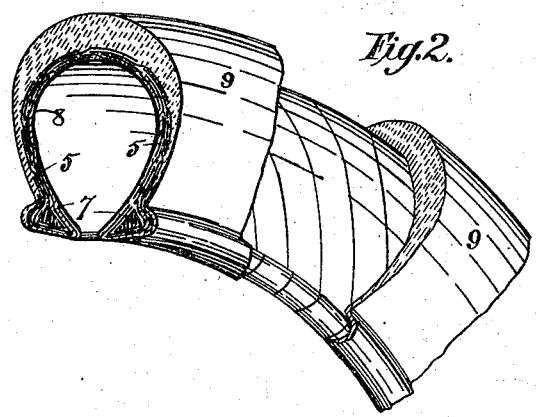
Figure 3:
Figure 4:
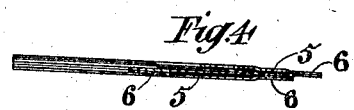

Figure 1 is a plan showing the arrangement of parts used in forming a cover. Fig. 2 shows in perspective view part of a pneumatic tire with the arrangement of strips in accordance with the invention. Fig. 3 is an enlarged sectional elevation on the line 1—1 of Fig. 1, showing the layers of rubber and canvas above and below the beads before the tire is finally formed. Fig. 4 is an enlarged view of part section, on line 2—2 of Fig. 1, showing two strips and attached rubbers.

In the construction of a pneumatic tire cover according to this invention, we first cut short strips of a woven fabric out of a sheet of material. It is preferable to cut the strips "on the bias" that is to say, neither along the woof nor the weft, but across each. Each of the strips 5 is faced on both sides with a thin sheet of rubber 6, which may completely cover the fabric so that the latter will be contained within a rubber envelop.

The strips are laid upon the "head" used in the construction of the tire and formed the shape and about the size of the inner tube of the tire being made, at an angle of about 45° with the face of the wheel and consequently when a second layer is laid on the first but from the other direction, such first and second layers will be at right angles to each other.

Each of the strips 5 overlaps its neighbor and along each of its edges a "gutter" is formed which if left unfilled will, owing to the number so constituted, be a source of weakness in the cover by preventing the proper vulcanization of the parts into a solid mass.

To insure the best results in the construction of a tire cover and from the subsequent vulcanizing process we may cause the rubber facings of the strips 5 to overlap on both edges for a distance sufficient, when the strips are laid, to come over the strips beneath and above and to overlap each just enough to fill the gutters formed by the contiguous strips. This arrangement is shown in Fig. 1 of the drawings.

In making a cover, the strips are laid overlapping each other across the former or mold from the right to left and then a second series of overlapping strips is laid at right angles to the first lot from left to right. The number of layers used will depend upon the class of tire required; for very heavy tires six or eight layers may be used, while for a light service as few as two may be sufficient. For ordinary tires four layers will suffice, two being placed under the annular beads 7 and two over the same.

Before commencing to lay the strips on the "head" former or mold we place upon the latter a rubber sheet which entirely covers the same. Upon the rubber sheet 8 we then lay the rubber incased strips in the manner explained.

By using the strips cut to a length only sufficient to cross the former diagonally from bead to bead we can be assured of better adhesion of the same when the tire cover is subjected in a press to the process of vulcanization. The fabric being entirely enveloped in rubber will not be visible and the rubber surfaces, the sheet 8 and the rubber 9 will have little difficulty in combining into an integral mass capable of withstanding the many and varied strains to which a tire is subjected during use.

To facilitate laying the strips on the former or mold we have found it convenient to cut and lay the same on the bench in the manner shown in Fig. 1 and then to apply the aggregation to the former. When the requisite number of layers has been put in position the edges of the aggregations of strips are rolled in the usual way upon the beads and when the tread of the tire has been put in position the whole is placed in a heated press for the purpose of vulcanization.

Fig. 3 is intended to represent an exaggerated transverse section of a cover wherein is clearly depicted the manner in which the strips overlap, the rubber being shown crosshatched in the solid form after vulcanization the better to distinguish the same from the strips 5 shown in heavy lines.

Having now described our invention what we claim as new and desire to secure by Letters Patent is:—

1. In a pneumatic tire cover a plurality of layers, each layer comprising strips of fabric extending in the same general direction and each strip overlapping the next adjacent strip on one side thereof and being overlapped by the next adjacent strip on the other side thereof each of said fabric strips being faced on one surface with sheets of rubber said rubber sheets extending beyond the longitudinal edges of said strips.

2. In a pneumatic tire cover, a plurality of layers, each of said layers comprising a plurality of overlapping strips, the strips of each layer running in the same direction, a sheet of material for each strip covering one face thereof and a second sheet of material for each of said strips covering the other face thereof, said sheets being of greater width than said strips, the strips and sheets of one layer extending at right angles to the strips of the next adjacent layer, all of said sheets and strips being formed into one integral mass.

In testimony whereof we have affixed our signatures in presence of two witnesses.

JOHN THOMAS JOHNSON.
FREDERICK GEORGE MASON.

Witnesses:
P. M. NEWTON,
M. ALLAN.

---

Copies of this patent may be obtained for five cents each, by addressing the "Commissioner of Patents. Washington, D. C."